(12) United States Patent
Maiklem

(10) Patent No.: US 12,710,561 B2
(45) Date of Patent: Aug. 18, 2026

(54) PIPELINE INSPECTION APPARATUS COMPRISING MULTIPLE BARREL SECTIONS, ARTICULATING COMPONENTS, AND RADIALLY EXTENDING STRUCTURES

(71) Applicant: Under Cover Technologies Corp., Calgary (CA)

(72) Inventor: Richard Maiklem, Calgary (CA)

(73) Assignee: UNDER COVER TECHNOLOGIES CORP., Calgary (CA)

( * ) Notice: Subject to any disclaimer, the term of this patent is extended or adjusted under 35 U.S.C. 154(b) by 222 days.

(21) Appl. No.: 18/600,001

(22) Filed: Mar. 8, 2024

(65) Prior Publication Data

US 2024/0302295 A1 Sep. 12, 2024

Related U.S. Application Data

(60) Provisional application No. 63/489,653, filed on Mar. 10, 2023.

(51) Int. Cl.
*G01N 23/222* (2006.01)
*G01N 23/221* (2006.01)
*G01V 5/10* (2006.01)

(52) U.S. Cl.
CPC ........... *G01V 5/101* (2013.01); *G01N 23/221* (2013.01); *G01N 23/222* (2013.01); *G01N 2223/074* (2013.01); *G01N 2223/0745* (2013.01)

(58) Field of Classification Search
CPC ............... G01N 23/221; G01N 23/222; G01N 2223/074; G01N 2223/0745; G01V 5/04; G01V 5/06; G01V 5/08; G01V 5/10; G01V 5/101; G01V 5/102; G01V 5/104; G01V 5/105; G01V 5/107; G01V 5/108; G01V 5/14; G01V 5/145; G01V 5/234
USPC .................................................. 376/157–166
See application file for complete search history.

(56) References Cited

U.S. PATENT DOCUMENTS

| | | | | |
|---|---|---|---|---|
| 9,012,836 | B2 * | 4/2015 | Wilson .................. | G01V 5/101 250/254 |
| 9,880,316 | B2 | 1/2018 | Kramer | |
| 10,061,055 | B2 * | 8/2018 | Grau ...................... | G01V 5/104 |
| 10,145,978 | B2 * | 12/2018 | Guo ....................... | G01V 5/101 |
| 10,156,657 | B2 * | 12/2018 | Guo ....................... | G01V 5/102 |
| 10,162,078 | B2 * | 12/2018 | Zhang .................... | G01V 5/107 |
| 10,261,214 | B2 * | 4/2019 | Stoller .................. | G01V 5/104 |
| 10,274,637 | B2 * | 4/2019 | Zhou ...................... | G01V 5/101 |
| 10,379,253 | B2 * | 8/2019 | Zhou ...................... | G01V 5/104 |
| 10,429,540 | B2 * | 10/2019 | Grau ...................... | G01V 5/101 |
| 10,466,383 | B2 * | 11/2019 | Zhou ...................... | G01V 5/107 |
| 10,466,384 | B2 * | 11/2019 | McKeon ................ | G01V 5/101 |
| 10,564,311 | B2 * | 2/2020 | Stoller .................. | G01V 5/101 |
| 10,585,209 | B2 * | 3/2020 | Inanc ..................... | G01V 5/102 |
| 10,591,630 | B2 * | 3/2020 | Berheide ............... | G01V 5/101 |
| 10,690,802 | B2 * | 6/2020 | Stoller .................. | G01V 5/101 |
| 10,725,201 | B2 * | 7/2020 | Mendez ................ | G01V 5/102 |

(Continued)

FOREIGN PATENT DOCUMENTS

WO 2020/113333 A1 6/2020

*Primary Examiner* — Allen C. Ho

(57) ABSTRACT

A pipeline inspection apparatus for moving through an interior of a pipeline and inspecting a region surrounding the pipeline, comprising a neutron source and scintillator sensors housed within one or more sections and including a positioning system that cooperates to position the one or more sections within the pipeline.

20 Claims, 4 Drawing Sheets

(56) References Cited

U.S. PATENT DOCUMENTS

| | | | | |
|---|---|---|---|---|
| 10,732,317 | B2 * | 8/2020 | Kasten | G01V 5/145 |
| 10,895,662 | B2 * | 1/2021 | Inanc | G01V 5/102 |
| 10,914,861 | B2 * | 2/2021 | Omeragic | G01V 5/12 |
| 11,125,082 | B2 * | 9/2021 | Waid | G01V 5/108 |
| 11,181,660 | B2 * | 11/2021 | Nguyen | G01V 5/101 |
| 11,204,439 | B2 * | 12/2021 | Guo | G01V 5/045 |
| 11,215,732 | B2 * | 1/2022 | Mendez | G01V 5/12 |
| 11,402,537 | B2 * | 8/2022 | Han | G01V 5/102 |
| 11,624,855 | B2 * | 4/2023 | Mamtimin | G01V 5/101 250/269.5 |
| 11,635,543 | B2 * | 4/2023 | Mamtimin | G01V 5/102 702/8 |
| 11,681,070 | B2 * | 6/2023 | Mamtimin | G01V 5/105 250/269.2 |
| 11,774,630 | B2 * | 10/2023 | Inanc | G01V 5/105 250/264 |
| 11,815,478 | B2 * | 11/2023 | Rego | G01V 5/101 |
| 11,841,335 | B2 * | 12/2023 | Wakabayashi | G01V 5/22 |
| 11,906,690 | B2 * | 2/2024 | Inanc | G01V 5/101 |
| 11,939,858 | B2 * | 3/2024 | Yuan | G01V 5/101 |
| 11,988,802 | B2 * | 5/2024 | Craddock | G01V 5/101 |
| 12,099,163 | B1 * | 9/2024 | Mamtimin | G01V 5/102 |
| 12,135,402 | B2 * | 11/2024 | Mamtimin | G01V 5/102 |
| 12,228,031 | B2 * | 2/2025 | Mamtimin | G01V 5/101 |
| 12,276,769 | B2 * | 4/2025 | Mamtimin | G01V 5/102 |
| 12,474,500 | B2 * | 11/2025 | Mamtimin | G01V 5/101 |
| 12,474,501 | B2 * | 11/2025 | Mamtimin | G01V 5/105 |

* cited by examiner

200

| example PIPELINE NAME | Backfill Density kg/m3 | Water saturation | hydrocarbons | Salt water | fresh water | Voids | Meters | Solid backfill | PIPE DEPTH MEASURED (m) | DEPTH OF COVER (m) |
|---|---|---|---|---|---|---|---|---|---|---|
| NPS 8 Big company to small town crude oil | 1 | Yes | No | No | yes | No | 0 | Yes | 1 | 1.1 |
| NPS 8 Big company to small town crude oil | 0.82 | Yes | oil | No | No | No | 10 | Yes | 0.92 | 1.2 |
| NPS 8 Big company to small town crude oil | 1.2 | Yes | No | yes | No | No | 20 | Yes | 1.05 | 1.3 |
| NPS 8 Big company to small town crude oil | 0.3 | No | yes | No | No | yes | 30 | No | 0.85 | 0.75 |
| NPS 8 Big company to small town crude oil | 0.25 | No | Yes | No | No | yes | 40 | No | 0.85 | 0.75 |
| NPS 8 Big company to small town crude oil | 1.5 | Yes | No | Yes | No | No | 50 | Yes | 0.85 | 1.1 |

| NORTHING (m) | EASTING (m) | LEGAL LOCATION | LATITUDE | LONGNITUDE | GRADE ELEVATION (m) | AZIMITH |
|---|---|---|---|---|---|---|
| 1234567.89 | 1234567.89 | SW 01-02-03-W4M | 53.13202 | -114.45773 | 853.65 | 94.5125715 |
| 1234567.89 | 1234567.89 | SW 01-02-03-W4M | 53.13202 | -114.45773 | 855.23 | 93.98807145 |
| 1234567.89 | 1234567.89 | SW 01-02-03-W4M | 53.13202 | -114.45773 | 857.56 | 94.01342425 |
| 1234567.89 | 1234567.89 | SW 01-02-03-W4M | 53.13202 | -114.45773 | 859.39 | 93.3026734 |
| 1234567.89 | 1234567.89 | SW 01-02-03-W4M | 53.13202 | -114.45773 | 861.35 | 93.21508831 |
| 1234567.89 | 1234567.89 | SW 01-02-03-W4M | 53.13202 | -114.45773 | 863.31 | 93.06070782 |

FIG. 2

PIPELINE INSPECTION APPARATUS COMPRISING MULTIPLE BARREL SECTIONS, ARTICULATING COMPONENTS, AND RADIALLY EXTENDING STRUCTURES

RELATED APPLICATIONS

This application claims benefit of and priority to U.S. Provisional Patent Application No. 63/489,653 filed Mar. 10, 2023, the contents of which are incorporated herein by reference.

FIELD

This disclosure relates generally to an apparatus and method for pipeline inspection.

BACKGROUND

Pipelines frequently run underground and/or through restricted access regions. Inspection of such pipelines can be difficult. Existing inspection solutions can suffer from one or more deficiencies, including for example: (I) lack consistent accuracy; (ii) lack of timely information from above ground surveys; (iii) lack of access to pipeline Right of Ways for ground crews; (iv) lack of access to information about a condition of the backfill around the pipeline and changes to the backfill around the pipeline.

Internal pipeline solutions can be used to inspect pipelines that cannot be easily externally inspected. Borehole inspection solutions are disclosed for example in U.S. Pat. No. 9,880,316, issued Jan. 30, 2018, entitled "MULTIPLE SOURCE NEUTRON MEASUREMENT, DEVICE, SYSTEM AND USE THEREOF", and International Patent Application Publication WO 2020/113333, published Jun. 11, 2020, entitled "DENSITY MEASUREMENT DEVICES AND METHODS". The content of these documents, and all published documents identified herein, are incorporated herein by reference.

The aforementioned documents disclose borehole inspection solutions that are intended to inspect downwardly extending borehole structures.

There is a need for improved apparatus and methods for pipeline inspection of horizontally extending pipelines that transport fluids over large distances.

SUMMARY

According to an example aspect, a pipeline inspection apparatus is disclosed that can operate inside a pipeline and inspect a region surrounding the pipeline, and which includes a positioning system for positioning the apparatus within the pipeline.

According to a first example aspect, a pipeline inspection apparatus is disclosed for inspecting a region external to a pipeline while moving through an interior of the pipeline. The pipeline inspection apparatus includes a neutron source and scintillator sensors housed within one or more sections and including a positioning system that cooperates to position the one or more sections within the pipeline. The pipeline inspection apparatus is longitudinally flexible to enable the apparatus to accommodate curvature in the pipeline.

In an example of the first aspect, the pipeline inspection apparatus includes a plurality of the sections, each section housing one or more respective functional components, the sections being connected in-line by articulating components that configure the pipeline inspection apparatus to be longitudinally flexible.

In one or more of the above examples, the functional components include the neutron source and the scintillator sensors, an inertial measurement unit (IMU), and a logging computer, the logging computer being configured to record data based on measurements acquired by the scintillator sensors and the IMU.

In one or more of the above examples, the neutron source is located in a first section of the plurality of sections and the scintillator sensors are located in a second section of the plurality of sections.

In one or more of the above examples, the functional components include an odometer system for measuring a travel distance of the pipeline inspection apparatus within the pipeline.

In one or more of the above examples, the odometer system comprises one or more odometer wheels mounted to one or more of the sections and biased to contact an inner surface of the pipeline.

In one or more of the above examples, the positioning system comprises one or more radially extending support structures mounted to each of the respective sections, the radially extending support structures each being configured slidably engage an inner surface of the pipeline.

In one or more of the above examples, the radially extending support structures are releasably mounted to the respective sections, enabling the inspection apparatus to be adapted to different pipeline diameters.

In one or more of the above examples, the radially extending support structures are flexible disc shaped structures and are configured with sufficient surface area to enable a fluid flowing within the pipeline to propel the pipeline inspection apparatus through the pipeline under the force of the flowing fluid.

In one or more of the above examples, the radially extending support structures are pig cups.

In one or more of the above examples, the articulating components each comprise a respective knuckle joint, universal joint or ball joint.

According to a second example aspect, a pipeline inspection apparatus is disclosed that includes: a first component housing section including a neutron source; a second component housing section coupled to the first component housing section and including one or more gamma ray sensors for measuring gamma rays; and one or more support structures extending outward from each of the first and second component housing sections. The first component housing section, second component housing section, and support structures are cooperatively configured such that as the pipeline inspection apparatus moves through an interior of a pipeline: the support structures support the first component housing structure and the second component housing structure centrally within the pipeline; the first component housing section and the second component housing sections can articulate relative to each other as the pipeline inspection apparatus moves through curves in the pipeline; the neutron source can emit neutrons into regions surrounding the pipeline; and the one or more gamma ray sensors can measure gamma rays entering the pipeline from the regions surrounding the pipeline.

In one or more of the above examples of the second aspect, the second component housing section is coupled to the first component housing section by an articulating joint.

In one or more of the above examples of the second aspect, a third component housing section is coupled to the second component housing section by a further articulating joint, the third component housing section including a power source for one or both of the neutron source and the gamma ray sensors.

In one or more of the above examples of the second aspect, an inertial measurement unit (IMU) and a logging computer are provided, the IMU being configured to generate pose data indicating a position and an orientation as the pipeline inspection apparatus moves through the interior of a pipeline, the logging computer configured to log the pose data in synchronization with data obtained based on measurements by the gamma ray sensors.

In one or more of the above examples of the second aspect, the support structures each comprise a radially extending disc configured to slidably engage an inner wall of the pipeline, the support structures providing surface area to enable a fluid moving within the pipeline to propel the pipeline inspection apparatus through the pipeline.

In one or more of the above examples of the second aspect, the apparatus includes a sensor (for example an odometer wheel) configured to measure travel distance relative to an interior surface of the pipeline.

According to further example aspects, a method is disclosed for inspecting regions surrounding a subterranean pipeline that is used to transport a fluid from a first location to a second location. The method includes causing the inspection apparatus of any of the preceding examples to move through the pipeline with the gamma ray source emitting gamma rays and the one or more gamma ray sensors measuring gamma rays; and computing and storing density information for the surrounding regions based on the measured gamma rays.

In some examples the method includes mapping the density information to material types and generating a profile of material types along a length of the pipeline.

In some examples the method includes causing the inspection apparatus to move through the pipeline comprises subjecting the one or more support structures to fluid pressure of a fluid flowing through the pipeline.

BRIEF DESCRIPTION OF THE DRAWINGS

Reference will now be made, by way of example, to the accompanying drawings which show example embodiments of the present application, and in which:

FIG. 2 shows a chart illustrating examples of outputs that that can be obtained using the pipeline inspection apparatus of FIG. 1.

Similar reference numerals may have been used in different figures to denote similar components.

DESCRIPTION OF EXAMPLE EMBODIMENTS

Figure 1:
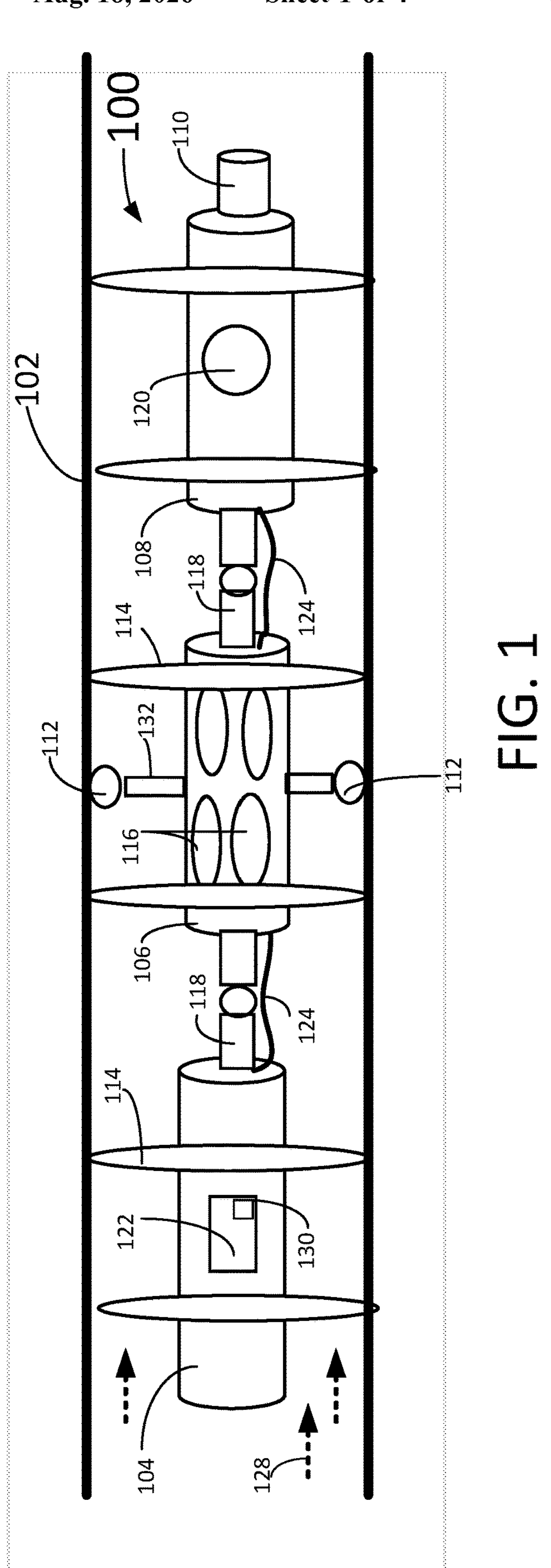
FIG. 1 is a schematic diagram illustrating a pipeline inspection apparatus according to example implementations.

According to an example embodiment, a pipeline inspection apparatus and method are disclosed that can mitigate against shortcomings of prior inspection solutions. FIG. 1 illustrates, accordance with an example embodiment, an in-line pipeline inspection apparatus 100, also referred to herein as a tool, that can be placed inside and moved along a pipeline 102 to perform an inspection.

In some applications, the disclosed tool can address one or more of the issues faced by prior solutions, including: lack of consistent accuracy and timely information from above ground surveys; lack of access to pipeline Right of Ways for ground crews; and/or lack of information about the condition of the backfill around the pipeline and changes to the backfill around the pipeline. In some examples the disclosed tool 100 is configured to measure and output data that is indicative of depth of cover over the pipeline 102, hydrocarbons present around the pipeline 102, water and salt water around the pipeline 102, gaps, voids, spans under and around the pipeline 102, and lithology changes in the backfill around the pipeline 102.

In example embodiments, the tool 100 will travel inside the pipeline 102 and is centered in the pipeline 102, measuring directly from inside the pipeline 102 the above-noted conditions about the region that is external to the pipeline. In example implementations, the tool can be operated and run through pipeline 102 in any weather condition (e.g., at any time of year) and landowner permission is not required to run the tool 100 as it can be inserted and removed from the pipeline 102 at authorized access points. Using the tool 100 to replace above ground surveys allows the pipe information to be gathered when ground conditions are not favorable to use ground crews.

In the example of FIG. 1, the tool 100 includes multiple functional modules or units that take the form of rigid, tubular sections 104, 106, 108 that house operational components and are flexibly linked (e.g., coupled together) together along an elongate axis of the tool 100. The modular sections 104, 106, 108 can be elongated sections that are cylindrically shaped (e.g., barrel sections), or take other shapes (e.g., have a rectangular or oval cross-sectional shape orthogonal to the longitudinal axis of the tool 100). A positioning system (for example a set of longitudinally positioned radially extending structures 114 such as pig cups positioned on respective barrel sections 104, 106, 108 (e.g., functional units) of the tool 100) is provided to center the tool 100 within the pipeline 102. In the illustrated example the barrel sections 104, 106, 108 are interconnected (e.g., coupled) by articulating components 118. Among other things, the articulating components can each be implemented using a pair of shafts that are coupled by an articulating joint such as such as a knuckle joint, universal joint, or ball joint. In particular, first barrel section 104 is connected by an articulating component 118 to second barrel section 106 which in turn is connected by a further articulating component 118 to third barrel section 108, forming a segmented chain of modular sections that provides flexibility that enables tool 100 to pass through curves in pipeline 102. The multiple segment sections can also facilitate insertion and removal of tool 100 the pipeline 102 at access points.

The barrel sections 104, 106 and 108 can each house respective functional components. In the illustrated example, power and processing components 122 (e.g., battery/storage/odometer/processor/computer components are included in one barrel section (e.g., first barrel section 104); scintillator sensors 116 and odometer sensor wheels 112 are included in a middle barrel section (e.g., second barrel section 106); and an inertial measurement unit (IMU) 120 is included in a further barrel section (e.g., third barrel section 108) that also includes a neutron source 110. The electrical components that are housed in each of the barrel sections 104, 106 and 108 can be connected by inter-sectional electrical cables 124 that can be configured to carry power and signals between the electrical components of the barrel sections 104.

In the illustrated example, the positioning system includes two radially extending structures 114 per barrel section 104, 106, 108. The structures 114 can, as indicated above, take the form of flexible disk-like members such as pig cups. In some examples, the radially extending structures 114 are formed form polyethylene material and are fitted onto the circumference of barrel sections 104, 106, 108 at locations that enable each respective barrel section 104, 106, 108 to be centrally maintained within the pipeline 102 as the tool 100 moves through the pipeline 102. Thus, the articulating tool 100 is centered in the pipeline 102 by the radially extending structures 114 of its positioning system, enabling accurate measurements to be obtained by the sensors of the tool 100. The use of an in-pipeline apparatus such as tool 100 can be beneficial in situations where ground survey crews are not able to walk along the pipeline right of way or dig down to the pipeline 102 and expose the pipeline for a visual inspection. The tool 100 can also give accurate information about different substances outside the pipeline 102. This can aid in leak detection of hydrocarbons as it will give concise feedback if hydrocarbons or other substances have leaked from the pipeline.

In some examples, the tool 100 can be implemented using a neutron logging tool (such as described in the above mentioned publication, U.S. Pat. No. 9,880,316, issued Jan. 30, 2018, entitled "MULTIPLE SOURCE NEUTRON MEASUREMENT, DEVICE, SYSTEM AND USE THEREOF") modified to be run in a pipeline, with knuckle joints (e.g., articulating components 118, pig cups (radially extending structures 114), odometer, calipers and an inertial mapping unit (IMU) 120. The tool 100 can run with a neutron source 110 and gamma ray scintillator sensors 116. The neutron source 110 functions as an omni-directional neutron emitter Neutrons are emitted through the pipeline 102 into the surrounding region, and the gamma ray scintillator sensors 116, which are circumferentially placed about the barrel section, measure resulting gamma rays returning from the surrounding region. The measurements can be processed to determine density information for the surrounding region. In at least some examples, scintillator sensors 116 (for example, an array of 24 sensors) are longitudinally spaced at least 90 cm from neutron source 110, and are circumferentially spaced around an outer wall of the barrel section 106 to collectively enable three hundred and sixty degrees of density measurements to be obtained around the pipe 102. Data from positional sensors (e.g., IMU 120 and an odometer system comprising odometer/odometer sensor wheels 112) provide tool pose data (e.g., tool position and orientation) in synchronization with the density information, allowing the density information for the surrounding region to be mapped in three dimensions during an inspection run. In the example of FIG. 1, neutron source 110 extends axially outward from an end of the third barrel section 108, so as to be centrally located within pipeline 102 during an inspection run.

In at least some applications, the disclosed tool 100 can more quickly gain information about what is happening outside the pipeline 102 when compared to surface-based inspection techniques. The tool 100 can be run for the entire length of a pipeline 102 and the sensed information about the surrounding region can be used to detect hydrocarbons outside the pipe. Collected data, logged by an onboard computer 130, can be accessed and downloaded more quickly than compared to solutions that require ground crews walking the length of the pipeline 102 in rugged terrain. The density information and pose data obtained through tool 100 can be used to gain information about the water content of the backfill, lithology of the backfill, detect hydrocarbons, saline water, gaps, spans, density of the backfill and depth of cover over the pipeline 102.

In an example embodiment, the radially extending disc structures 114 of the positioning system serve a further purpose of enabling propulsion of the tool 100 through the pipeline 102 under the force of a fluid 128 flowing through the pipeline 102. In this regard, the radially extending disc structures 114 provide surfaces that fluid 128 pushes against to propel the tool 100 within pipeline 102. In some examples, a cable can attached to an end of the tool 100 and used to pull the tool 100 through pipeline 102.

In some examples, onboard computer 130 can be configured to perform density computations to obtain density information for the surrounding regions based on the sensed gamma ray information. In other examples, the raw gamma ray information may be processed to obtain the density information at a remote computer once retrieved from the onboard computer 130. In examples where raw gamma ray information is processed at onboard computer 130 to obtain density information, onboard computer 130 may also be configured to map that density information to specific material properties of the surrounding region (e.g., water content of the backfill, lithology of the backfill, detect hydrocarbons, saline water, gaps, spans, density of the backfill and depth of cover). In some examples, some or all of the mapping of density information to material properties of the surrounding region may be performed at a remote computer that obtains logged data from onboard computer 130. In some examples, power and processing components 122 includes a physical port that enables a data cable to be used to transfer logged data from the onboard computer 130 to a further computing device once the tool 100 is retrieved. In some examples, power and processing components 122 includes a telemetry system that enables the logged data to be wirelessly transferred once the tool 100 is retrieved. In at least some examples, power and processing components 122 includes a telemetry system that can enable data to be transmitted via a wireless communication system to a remote processing computer in real time during an inspection run.

In some examples, power and processing components 122 include a satellite positioning system receiver (e.g., a Global Position System (GPS) receiver) that enables an exact object tool location to be determined at the points of tool insertion into a pipeline and tool retrieval. Such information can be combined with pose data collected by onboard tool sensors (e.g., positional sensors) to improve the accuracy of such pose data. In some examples, power and processing components 122 can include sensors for local positioning systems that may be present in the pipeline environment.

In one example procedure, the tool 100 is used to inspect a constant diameter section of a pipeline 102 in a manner similar to that used in a conventional "pigging operation". In this regard, the tool 100 can be introduced to the pipeline 102 via a pig launcher, and propelled by a process fluid 128 (e.g., liquid natural gas, oil, water, etc.) that flows as part of normal pipeline operation to inspect a section of the pipeline 102. The tool 100 can then be retrieved from the pipeline 102 at a downstream pig receiver.

FIG. 2 shows a chart 200 illustrating material properties and positional data for a surrounding region of a pipeline 102 (e.g., "NPS 8 Big company to small town crude oil" pipeline) that can be determined by a computer system (e.g. computing system 130 and/or a remote computer that data is uploaded to) based on the density information and pose data obtained from a tool 100. Such information includes, for each of a series of locations along the length of the inspection run at 10 m intervals: (i) backfill density; (ii) presence in surrounding region of one or more of: (a) water saturation, (b) hydrocarbons, (c) salt water, (d) fresh water, (e) voids (f) solid backfill; (iii) pipe depth; and (iv) depth of cover.

Figure 3:
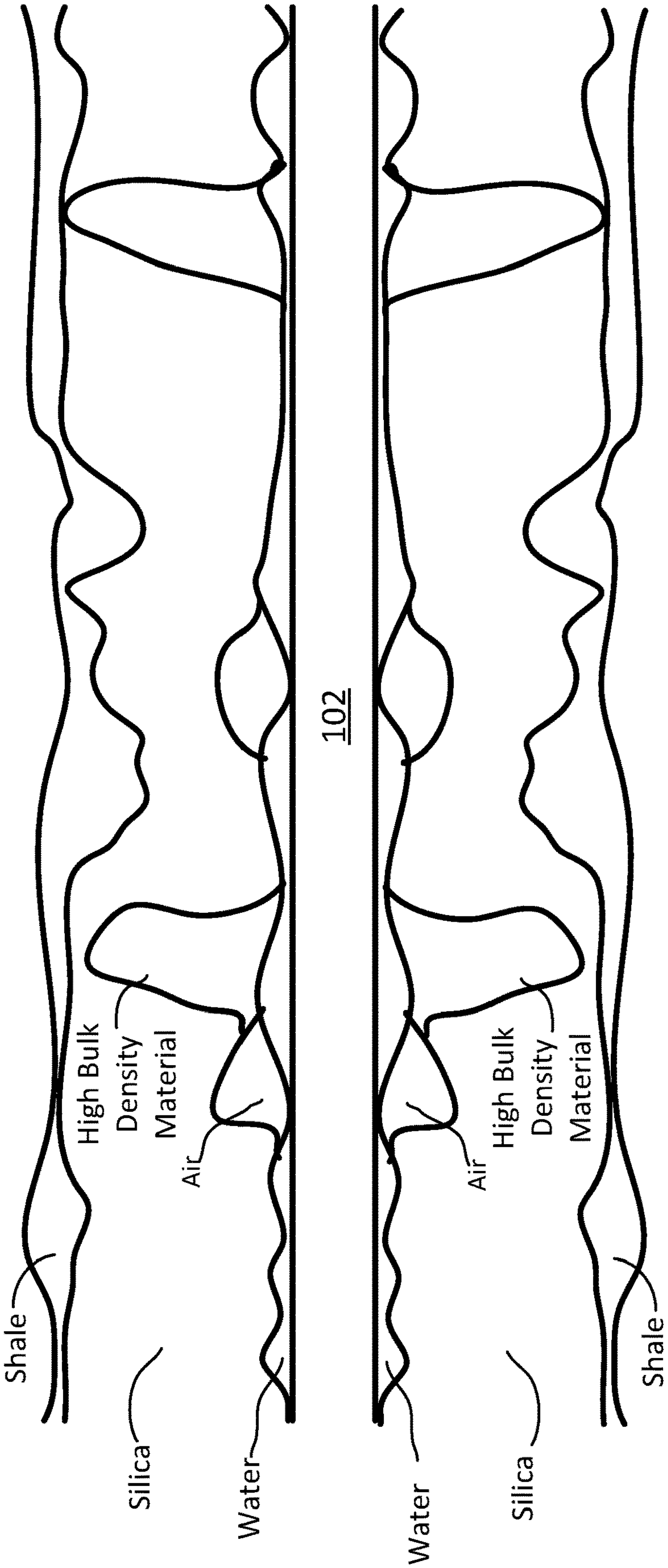
FIG. 3 is a sectional drawing illustrating types of materials detected surrounding a pipeline.

FIG. 3 illustrates an example of a graphical output generated by a computer system based on the density information and pose data obtained from a tool 100. The graphical output is a sectional representation illustrating properties e.g., types and amounts) of materials surrounding a pipeline, representing a profile of material types located in the regions surrounding the inspected length of the pipeline 102.

In various examples, the dimensions and configuration of the tool 100 and its constituent components can be designed to accommodate different types of pipelines, pipeline paths, and pipeline diameters.

By way of non-limiting example, in the case of a pipeline 102 having an outer diameter of 114.3 m and an inner diameter of 106.3 mm, each of the barrel sections 104, 106, 108 could have a common outer diameter of between 35 mm and 50 mm, and a respective length of between 40 cm and 60 cm. Articulating components 108 could each have a respective length of between 15 cm and 45 cm, providing a total tool length of between 1.5 m and 2.7 m. The radially extending support structures 114 may for example have an outer diameter that is slightly larger than the pipeline inner diameter, for example 1 mm to 4 mm larger than the pipeline inner diameter, with sufficient flexibility to enable the tool 100 to slide through the pipeline 102. The length of articulating components 108 determines inter-section spacing, which in turn impacts a turning radius of the tool 100. Accordingly, longer articulating components 108

In the illustrated example, odometer wheels 112 are fitted on structures (e.g., arms 132) that extend radially from a cylindrical housing of barrel section 106 to enable the odometer wheels 112 to contact opposite portions of the pipeline wall and to obtain wheel-revolution based distance measurements that are communicated to on-board odometer. In some examples, the odometer wheels 112 and/or arms 132 are configured to flexibly bias the odometer wheels 112 into contact with the pipeline wall surface in order to maintain contact with the wall surface while accommodating any inward protuberances that may be located along the wall surface. For example, odometer wheels 112 may be spring-mounted to arms 132, and/or arms 132 may be configured to provide spring-like resilience to enable the biasing of the wheels 112 against the pipeline walls.

In some examples, radially extending support structures 114 and arms 132 are removably fixed to the barrel sections that they extend from so that they can quickly be replaced with support structures 114 and arms 132 of different sizes to adjust the total outer diameter of the tool 100 and allow it to be adapted for use in different diameter sized pipelines.

Figure 4:
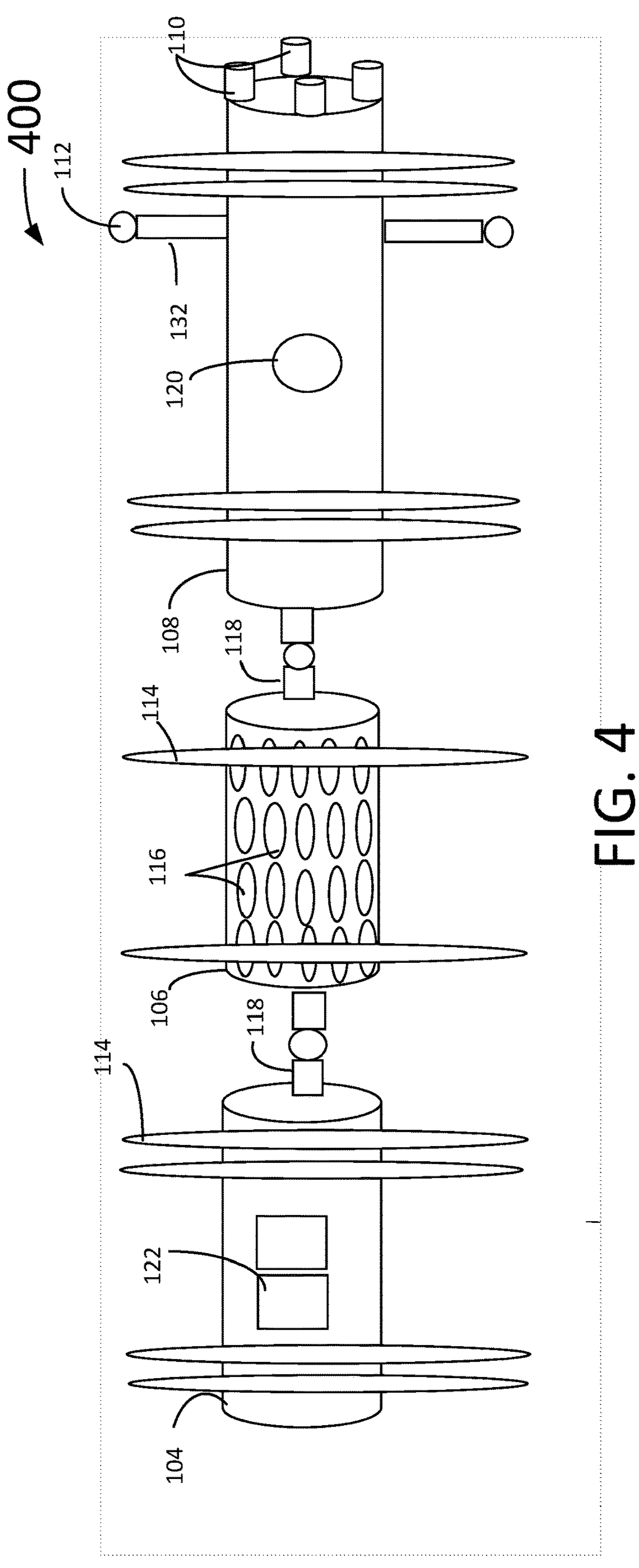
FIG. 4 is a schematic diagram illustrating a further pipeline inspection apparatus according to example implementations.

In some examples, a larger version of the inspection tool may be manufactured with a greater number of neutron sources 110 and scintillator sensors 116 to enable the tool to penetrate the region around larger diameter pipelines, for example a 1.2 m diameter pipeline. In this regard, FIG. 4 illustrates an example of a tool 400 that is similar in configuration and operation to tool 100 except that tool 400 is a scaled-up version, having larger diameter barrel sections 104, 106, 108 and four neutron sources 110 that are symmetrically arranged around an outer end of third barrel section 108. Tool 400 also includes more scintillator sensors 116 (for example, an array of 128 sensors) circumferentially positioned about barrel section 106 to provide greater measurement and directional sensitivity. In the example of FIG. 4, four radially extending support structures 114 are located on each of the first and third barrel sections 104, 108 and two radially extending support structures 114 are located on second barrel section 106, and odometer wheels 122 are mounted to third barrel section 108.

In some alternative examples, the tool 100, 400 could, in place of a neutron source, use a different type of atomic particle emitter such as a gamma ray emitter as described in International Patent Application Publication WO 2020/113333, published Jun. 11, 2020, entitled "DENSITY MEASUREMENT DEVICES AND METHODS").

Although the present disclosure describes methods and processes with steps in a certain order, one or more steps of the methods and processes may be omitted or altered as appropriate. One or more steps may take place in an order other than that in which they are described, as appropriate.

The features and aspects presented in this disclosure may be embodied in many different forms and should not be construed as limited to the embodiments set forth herein. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure. Where possible, any terms expressed in the singular form herein are meant to also include the plural form and vice versa, unless explicitly stated otherwise. In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The contents of all published documents identified in this disclosure are incorporated herein by reference.

The invention claimed is:

1. A pipeline inspection apparatus for moving through an interior of a pipeline and inspecting a region external to the pipeline, comprising:

one or more sections;

a neutron source;

scintillation sensors; and a positioning system secured to the one or more sections to position the one or more sections within the pipeline, wherein each of the neutron source and the scintillator sensors being housed within a respective one of the one or more sections, and wherein the one or more sections being longitudinally flexible to enable the one or more sections to accommodate a curvature in the pipeline.

2. The pipeline inspection apparatus of claim 1 further comprising:

articulating components that configure the one or more sections to be longitudinally flexible; and one or more functional components, wherein the one or more sections comprise a plurality of sections, each section housing one of the one or more respective functional components, the plurality of sections being connected in-line by the articulating components.

3. The pipeline inspection apparatus of claim 2 wherein the one or more functional components include the neutron source, the scintillator sensors, an inertial measurement unit (IMU), and a logging computer, the logging computer being configured to record data based on measurements acquired by the scintillator sensors and the IMU.

4. The pipeline inspection apparatus of claim 3 wherein the neutron source is located in a first section of the plurality of sections and the scintillator sensors are located in a second section of the plurality of sections.

5. The pipeline inspection apparatus of claim 3 wherein the one or more functional components include an odometer system for measuring a travel distance of the pipeline inspection apparatus within the pipeline.

6. The pipeline inspection apparatus of claim 5 wherein the odometer system comprises one or more odometer wheels mounted to of the plurality of sections and biased to contact an inner surface of the pipeline.

7. The pipeline inspection apparatus of claim 2 wherein the positioning system comprises one or more radially extending support structures mounted to each of the plurality of sections, each of the one or more radially extending support structures being configured to slidably engage an inner surface of the pipeline.

8. The pipeline inspection apparatus of claim 7 wherein the one or more radially extending support structures are releasably mounted to the plurality of sections, enabling the pipeline inspection apparatus to be adapted to different diameters in the pipeline.

9. The pipeline inspection apparatus of claim 7 wherein the one or more radially extending support structures are flexible disc shaped structures and are configured with a sufficient surface area to enable a fluid flowing within the pipeline to propel the pipeline inspection apparatus through the pipeline under a force of the flowing fluid.

10. The pipeline inspection apparatus of claim 7 wherein the one or more radially extending support structures are pig cups.

11. The pipeline inspection apparatus of claim 2 wherein each of the articulating components comprises a respective knuckle joint, a universal joint, or a ball joint.

12. A pipeline inspection apparatus, comprising:

a first component housing section including a neutron source;

a second component housing section coupled to the first component housing section and including one or more gamma ray sensors for measuring gamma rays;

one or more support structures extending outward from each of the first component housing section and the second component housing section;

the first component housing section, the second component housing section, and the one or more support structures being cooperatively configured such that as the pipeline inspection apparatus moves through an interior of a pipeline;

the one or more support structures support the first component housing section and the second component housing section centrally within the pipeline;

the first component housing section and the second component housing section can articulate relative to each other as the pipeline inspection apparatus moves through curves in the pipeline;

the neutron source can emit neutrons into regions surrounding the pipeline; and the one or more gamma ray sensors can measure gamma rays entering the pipeline from the regions surrounding the pipeline.

13. The pipeline inspection apparatus of claim 12 further comprising:

an articulating joint, wherein the second component housing section is coupled to the first component housing section by the articulating joint.

14. The pipeline inspection apparatus of claim 13 further comprising:

a further articulating joint; and a third component housing section coupled to the second component housing section by the further articulating joint, the third component housing section including a power source for one or both of the neutron source and the one or more gamma ray sensors.

15. The pipeline inspection apparatus of claim 12 comprising further comprising:

an inertial measurement unit (IMU); and a logging computer, the IMU being configured to generate pose data indicating a position and an orientation as the pipeline inspection apparatus moves through the interior of a pipeline, the logging computer configured to log the pose data in a synchronization with data obtained based on measurements by the one or more gamma ray sensors.

16. The pipeline inspection apparatus of claim 12 wherein each of the one or more support structures comprises a radially extending disc configured to slidably engage an inner wall of the pipeline, the one or more support structures providing a surface area to enable a fluid moving within the pipeline to propel the pipeline inspection apparatus through the pipeline.

17. The pipeline inspection apparatus of claim 12 further comprising:

a sensor configured to measure a travel distance relative to an interior surface of the pipeline.

18. A method for inspecting regions surrounding a subterranean pipeline that is used to transport a fluid from a first location to a second location, comprising:

causing the pipeline inspection apparatus of claim 12 to move through the subterranean pipeline with the neutron source emitting neutrons and the one or more gamma ray sensors measuring gamma rays; and computing and storing density information for the surrounding regions based on the measured gamma rays.

19. The method of claim 18 further comprising:

mapping the density information for the surrounding regions to material types and generating a profile of material types along a length of the subterranean pipeline.

20. The method of claim 18 wherein causing the pipeline inspection apparatus to move through the subterranean pipeline comprises subjecting the one or more support structures to a fluid pressure of a fluid flowing through the subterranean pipeline.

* * * * *